US012409543B1

(12) United States Patent
Rivera

(10) Patent No.: US 12,409,543 B1
(45) Date of Patent: Sep. 9, 2025

(54) LOCK FOR FOLDING TOOL

(71) Applicant: Leatherman Tool Group, Inc., Portland, OR (US)

(72) Inventor: Benjamin C. Rivera, Portland, OR (US)

(73) Assignee: LEATHERMAN TOOL GROUP, INC., Portland, OR (US)

( * ) Notice: Subject to any disclaimer, the term of this patent is extended or adjusted under 35 U.S.C. 154(b) by 0 days.

(21) Appl. No.: 18/813,832

(22) Filed: Aug. 23, 2024

(51) Int. Cl.

| | |
|---|---|
| ***B25G 3/38*** | (2006.01) |
| ***B25F 1/04*** | (2006.01) |
| ***B26B 1/04*** | (2006.01) |

(52) U.S. Cl.
CPC .................. *B25G 3/38* (2013.01); *B25F 1/04* (2013.01); *B26B 1/042* (2013.01)

(58) Field of Classification Search
CPC . B25G 3/38; B25F 1/04; B26B 11/042; B26B 11/044
USPC ............................................................ 81/490
See application file for complete search history.

(56) References Cited

U.S. PATENT DOCUMENTS

| | | | | |
|---|---|---|---|---|
| 4,404,748 | A * | 9/1983 | Wiethoff | B26B 1/046 30/161 |
| 5,822,866 | A * | 10/1998 | Pardue | B26B 1/048 30/160 |
| 7,066,060 | B1 * | 6/2006 | Sebileau | B67B 7/184 81/3.43 |
| 7,854,067 | B2 * | 12/2010 | Lake | B26B 1/046 30/159 |

* cited by examiner

*Primary Examiner* — Hadi Shakeri
(74) *Attorney, Agent, or Firm* — ALSTON & BIRD LLP

(57) ABSTRACT

A lock is provided for a folding tool including a lock that engages a folding tool in an unfolded, deployed position to prevent unintended folding of the tool. By way of example a tool is provided including: a handle portion; a folding tool portion, where the folding tool portion is configured to be rotatable between a folded, stowed position at least partially within the handle portion, and a deployed position substantially outside of the handle portion; and a locking element, where the locking element is configured to engage a locking surface of the folding tool portion in response to the folding tool portion moving to the deployed position, where the locking element includes an arcuate surface for engaging the locking surface of the folding tool portion.

16 Claims, 21 Drawing Sheets

LOCK FOR FOLDING TOOL

TECHNOLOGICAL FIELD

An example embodiment relates generally to a lock for a folding tool, and in one embodiment, a lock that engages a folding tool in an unfolded, deployed position to prevent unintentional folding of the tool.

BACKGROUND

Folding tools, such as pocketknives, multipurpose tools, etc. are widely popular for their utility in a number of different applications. Pocketknives generally have a folding blade that is moved from a stowed position within a handle of the pocketknife to a deployed position where the folding blade is extended and can be used. A multipurpose tool includes a number of tool members carried by a common frame. A multipurpose tool may include different combinations of tool members depending upon its intended application. For example, multipurpose tools that are designed for a more universal or generic application can include pliers, a wire cutter, a bit driver, one or more knife blades, a saw blade or the like.

One reason for the popularity of folding tools is the convenience of a tool that can be carried in a small form factor, such as in a pocket. Further, the ability to fold a tool within a handle generally provides a small package that does not have sharp edges that may be present on the tool folded within the handle. For pocketknives, the folded, stowed position provides a safe way to carry a dangerous sharp object without requiring a sheath or the length of the entire handle and blade to be carried. Multipurpose tools provide a wide range of functionality with a single tool, thereby reducing the need to carry a number of different tools to perform the same functions. For example, a single multipurpose tool may be carried instead of a pair of pliers, one or more screwdrivers, a knife and a bottle opener. These different tools can be folded within the handle or handles of the multitool and have similar benefits as a pocketknife embodiment. As such, the burden placed upon the user is reduced since the user need only carry a single multipurpose tool.

As pocketknives and multipurpose tools are frequently carried by users in the field, it is desirable for the pocketknives and multipurpose tools to be relatively small and lightweight, while remaining rugged so as resist damage. In order to reduce the overall size of a tool, some tools have been designed to be foldable.

BRIEF SUMMARY

A tool, such as folding tool is provided which may include, for example, a pocketknife, a multipurpose tool, etc. Embodiments generally relate to a lock for a folding tool, and in one embodiment, a lock that engages a folding tool in an unfolded, deployed position to prevent unintended folding of the tool. Embodiments described herein include tool including: a handle portion; a folding tool portion, wherein the folding tool portion is configured to be rotatable about a folding tool axis between a folded, stowed position at least partially within the handle portion, and a deployed position substantially outside of the handle portion, where the folding tool portion comprises a cam portion disposed about the folding tool axis, where the cam portion defines a locking surface; and a locking element, where the locking element is configured to engage the locking surface of the folding tool portion in response to the folding tool portion moving to the deployed position, where the locking element is spring biased by a spring in a direction parallel to the folding tool axis, and where the locking element defines at least one of an arcuate surface or a wedge surface for engaging the locking surface of the folding tool portion.

According to some embodiments, the tool further includes a button, where the button is at least one of attached to the locking element or integrally formed with the locking element, where the button is configured to drive the locking element against spring bias to disengage the locking element from the locking surface. The button of an example embodiment defines a central button axis extending therethrough parallel to the folding tool axis, where the locking element defines a central locking element axis parallel to the folding tool axis, and where the central button axis and the central locking element axis are offset from one another.

According to certain embodiments the handle portion defines a first handle piece and a second handle piece, where the first handle piece defines a first aperture, where the second handle piece defines a second aperture, where the locking element is aligned with and guided by the first aperture, where the button is aligned with and guided by the second aperture. The button and the locking element of some embodiments are not mechanically coupled to the handle portion or the spring. According to some embodiments the locking element defines a detent ball, where the cam portion defines a recess, wherein in the folded, stowed position the detent ball engages the recess and holds the folding tool portion in the folded, stowed position.

According to some embodiments, the handle portion includes an abutment and the folding tool portion comprises a stopping surface defined by the cam portion, where in the deployed position, the folding tool portion is secured rotationally about the folding tool axis in a first direction by the locking element engaging the locking surface and in a second direction by the stopping surface engaging the abutment. In the deployed position of some embodiments, the locking element is held between the locking surface of the folding tool portion and a stop surface of the abutment. According to some embodiments the handle portion includes a first handle piece and a second handle piece, where the abutment is integrally formed with the first handle piece. According to certain embodiments the locking element defines the arcuate surface, wherein the arcuate surface of the locking element engages the locking surface of the folding tool portion at different angles based on a degree of overlap between the locking surface and the arcuate surface.

Embodiments provided herein include a tool including: a handle portion including a first handle piece and a second handle piece, the first handle piece defining an abutment; a folding tool portion, where the folding tool portion is configured to be rotatable about a folding tool axis between a folded, stowed position at least partially between the first handle piece and the second handle piece, and a deployed position substantially outside of the handle portion, where the folding tool portion includes a cam portion disposed about the folding tool axis, where the cam portion defines a locking surface; and a locking element, where the locking element is configured to be captured between the locking surface of the folding tool portion and the abutment in response to the folding tool portion moving to the deployed position, where the locking element is spring biased by a spring in a direction parallel to the folding tool axis, where the locking element defines at least one of an arcuate surface or a wedge surface for engaging the locking surface of the folding tool portion.

The tool of some embodiments includes a button, where the button is at least one of attached to the locking element or integrally formed with the locking element, where the button is configured to drive the locking element against spring bias to disengage the locking element from the locking surface. According to some embodiments the button defines a central button axis extending therethrough parallel to the folding tool axis, where the locking element defines a central locking element axis parallel to the folding tool axis, and where the central button axis and the central locking element axis are offset from one another.

According to certain embodiments the handle portion defines a first handle piece and a second handle piece, where the first handle piece defines a first aperture, where the second handle piece defines a second aperture, where the locking element is aligned with and guided by the first aperture, and wherein the button is aligned with and guided by the second aperture. The button and the locking element of some embodiments are not mechanically coupled to the handle portion or the spring. According to some embodiments the locking element defines a detent ball, where the cam portion defines a recess, where in the folded, stowed position the detent ball engages the recess and holds the folding tool portion in the folded, stowed position.

Embodiments provided herein include a tool including: a handle portion including a first handle piece defining a first aperture and a second handle piece defining a second aperture; a folding tool portion, where the folding tool portion is configured to be rotatable about a folding tool axis between a folded, stowed position at least partially between the first handle piece and the second handle piece, and a deployed position substantially outside of the handle portion, where the folding tool portion includes a cam portion disposed about the folding tool axis, where the cam portion defines a locking surface; a locking element, where the locking element is received within the first aperture where the locking element is movable along a locking axis parallel to the folding tool axis between an engaged position in which the locking element is engaged with the locking surface of the folding tool portion in the deployed position, and a disengaged position where the locking element does not contact the locking surface; and a button, where the button is received within the second aperture and is accessible through the second handle piece, where the button is at least one of attached to or integrally formed with the locking element, and where the button is movable along an axis parallel to the locking axis against a spring bias to move the locking element to the disengaged position.

According to some embodiments the button defines a central button axis extending therethrough parallel to the folding tool axis, where the locking element defines a central locking element axis parallel to the folding tool axis, and where the central button axis and the central locking element axis are offset from one another. According to certain embodiments the locking element defines a detent ball, where the cam portion defines a recess, where in the folded, stowed position the detent ball engages the recess and holds the folding tool portion in the folded, stowed position. According to some embodiments a surface of the locking element that engages the locking surface comprises a surface texture configured to engage the locking surface with a higher friction than a smooth surface texture.

Embodiments provided herein include a tool including: a handle portion; a folding tool portion, where the folding tool portion is configured to be rotatable between a folded, stowed position at least partially within the handle portion, and a deployed position substantially outside of the handle portion; and a locking element, where the locking element is configured to engage a locking surface of the folding tool portion in response to the folding tool portion moving to the deployed position, where the locking element includes an arcuate surface for engaging the locking surface of the folding tool portion.

According to some embodiments the folding tool portion rotates between the folded, stowed position and the deployed position about an axis where the tool portion includes a cam portion disposed about the axis. According to certain embodiments, the cam portion defines the locking surface where the locking surface is substantially parallel to the axis. The locking element of some embodiments is spring biased into engagement with the locking surface. The tool of some embodiments further includes a button, where the button is attached to the locking element and configured to drive the locking element against spring bias to disengage the locking element from the locking surface.

According to some embodiments the handle portion includes an abutment and the folding tool portion includes a stopping surface defined by the cam portion, where in the deployed position, the folding tool portion is secured rotationally about the axis in a first direction by the locking element engaging the locking surface and in a second direction by the stopping surface engaging the abutment. According to certain embodiments the folding tool portion includes a stop surface defined by the cam portion where rotation of the folding tool portion to the folded, stowed position is stopped by the stop surface engaging with the abutment.

The cam portion of certain embodiments defines a detent and the locking element includes a detent ball where in the folded, stowed position the detent ball engages the detent. According to certain embodiments the handle portion includes an abutment and the folding tool portion includes a stop surface defined by the cam portion where rotation of the folding tool portion to the folded, stowed position is stopped by the stop surface engaging with the abutment. The arcuate surface of the locking element of some embodiments engages the locking surface of the tool portion at different angles based on a degree of overlap between the locking surface and the arcuate surface.

Embodiments provided herein include a tool including: a handle portion; a folding tool portion including a cam portion, where the cam portion is disposed about an axis of rotation of the folding tool portion, where the folding tool portion is configured to be rotatable about the axis between a folded, stowed position at least partially within the handle portion, and a deployed position substantially outside of the handle portion; and a locking element, where the locking element is configured to engage a locking surface of the cam portion in response to the folding tool portion moving to the deployed position, where the locking element defines an arcuate surface for engaging the locking surface of the folding tool portion, and where the locking element includes a retaining feature to retain the folding tool portion in the folded, stowed position.

According to some embodiments the retaining feature includes at least one of a detent ball or a protrusion, where the cam portion defines a detent, and where in the folded, stowed position the at least one of the detent ball or the protrusion engages the detent. The cam portion of some embodiments defines the locking surface, where the locking surface is substantially parallel to the axis. According to certain embodiments the locking element is spring biased into engagement with the locking surface.

The tool of some embodiments also includes a button, where the button is attached to the locking element and configured to drive the locking element against spring bias to disengage the locking element from the locking surface. According to some embodiments the handle portion includes an abutment and the folding tool portion includes a stopping surface defined by the cam portion, where in the deployed position, the folding tool portion is secured rotationally about the axis in a first direction by the locking element engaging the locking surface and in a second direction by the stopping surface engaging the abutment.

According to certain embodiments the folding tool portion includes a stop surface defined by the cam portion, where rotation of the folding tool portion to the folded, stowed position is stopped by the stop surface engaging with the abutment. The handle portion of some embodiments includes an abutment, and the folding tool portion includes a stop surface defined by the cam portion, where rotation of the folding tool portion to the folded, stowed position is stopped by the stop surface engaging with the abutment. According to some embodiments the arcuate surface of the locking element engages the locking surface of the tool portion at different angles based on a degree of overlap between the locking surface and the arcuate surface. According to certain embodiments the folding tool portion further includes a grip, where the grip is actuatable by a thumb of a user's hand that holds the handle portion for one-handed deployment of the folding tool portion.

BRIEF DESCRIPTION OF THE DRAWINGS

Figure 1:
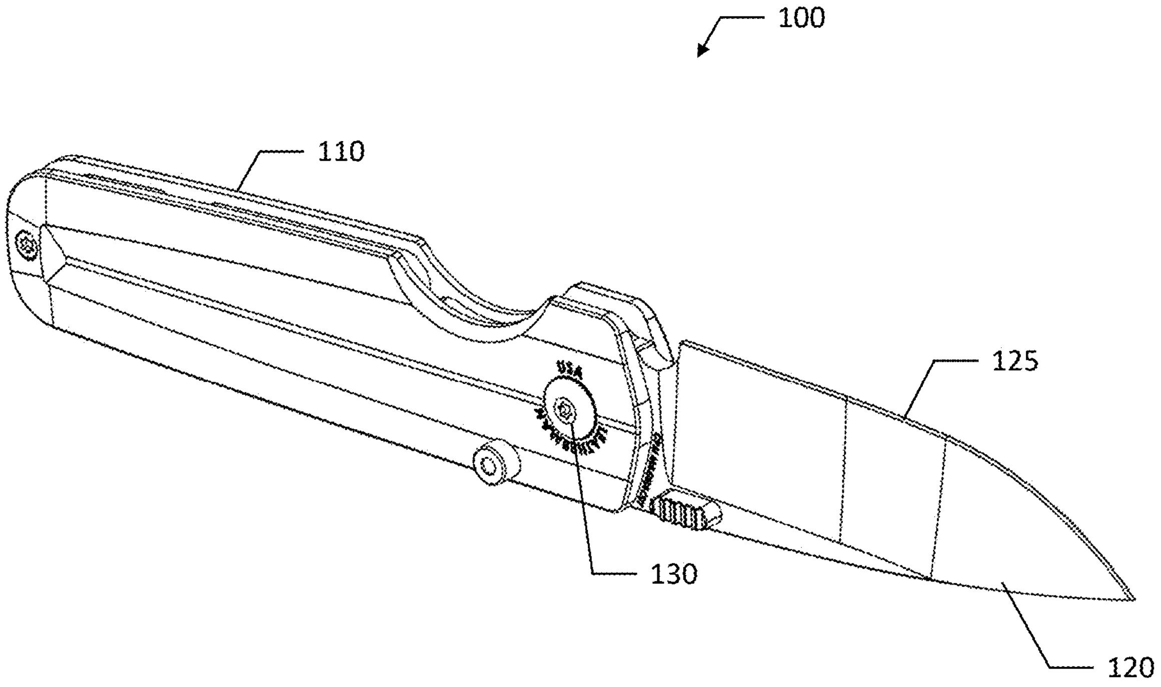
Figure 2:
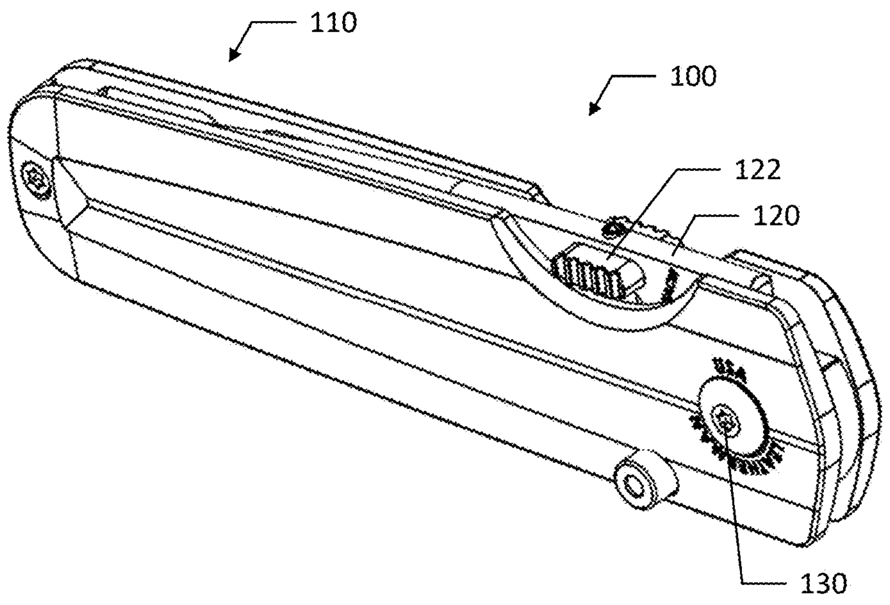
Figure 3:
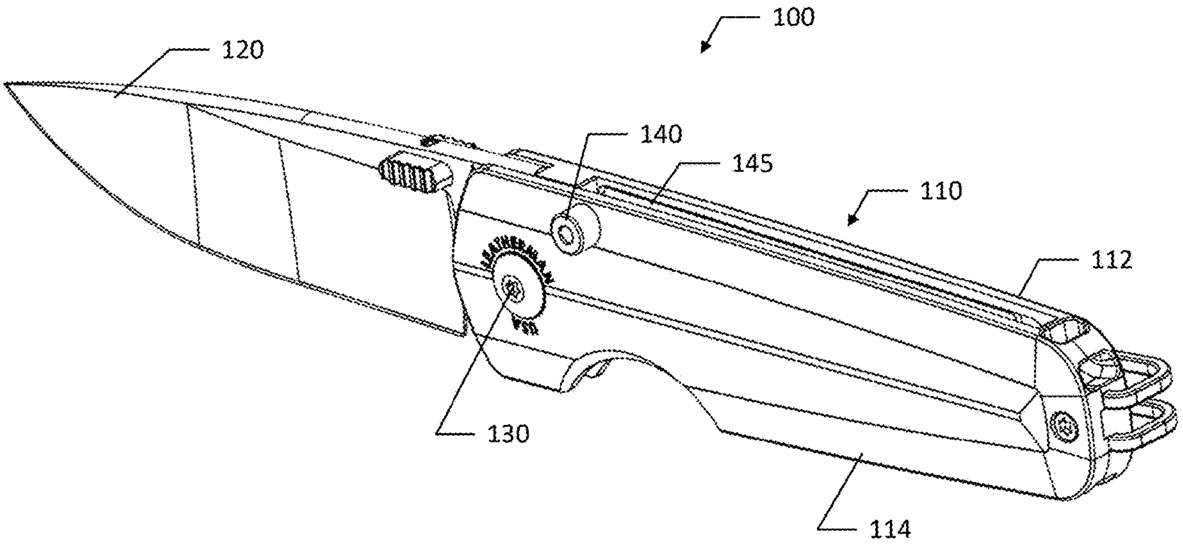
Figure 4:
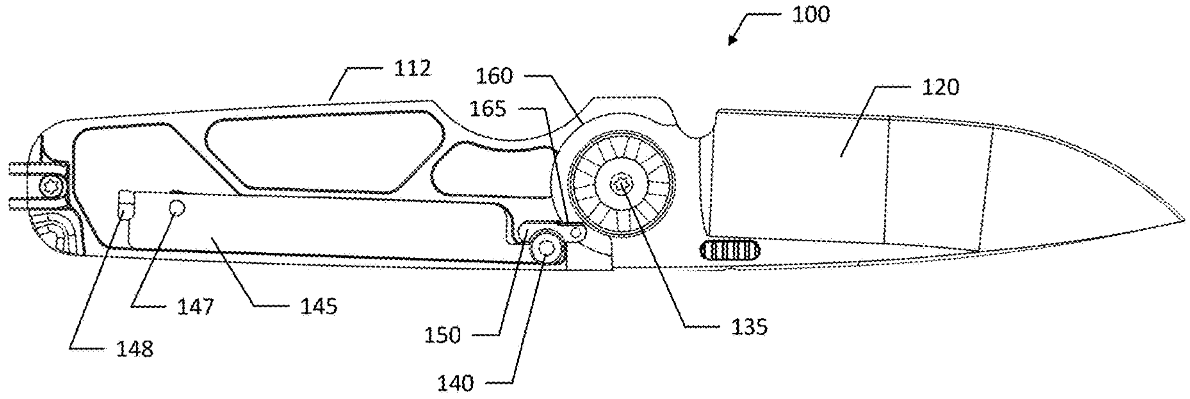
Figure 5:
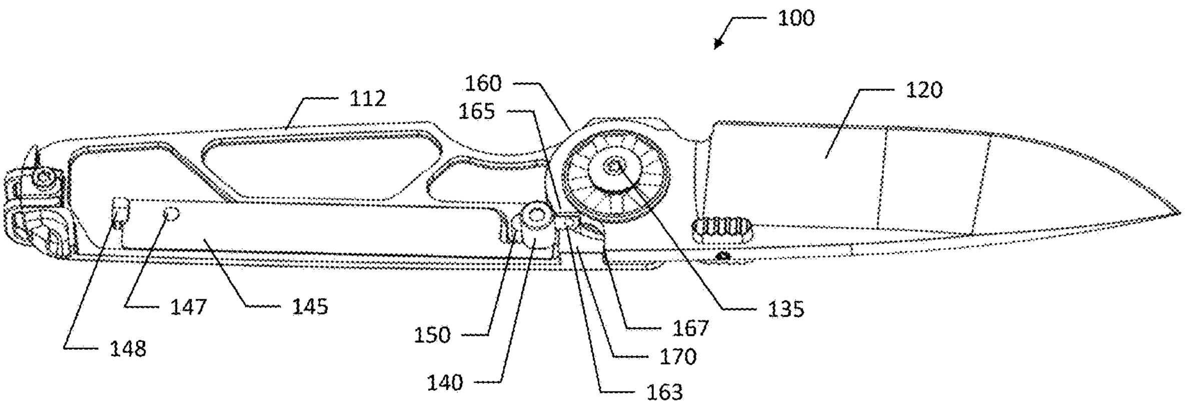
Figure 6:
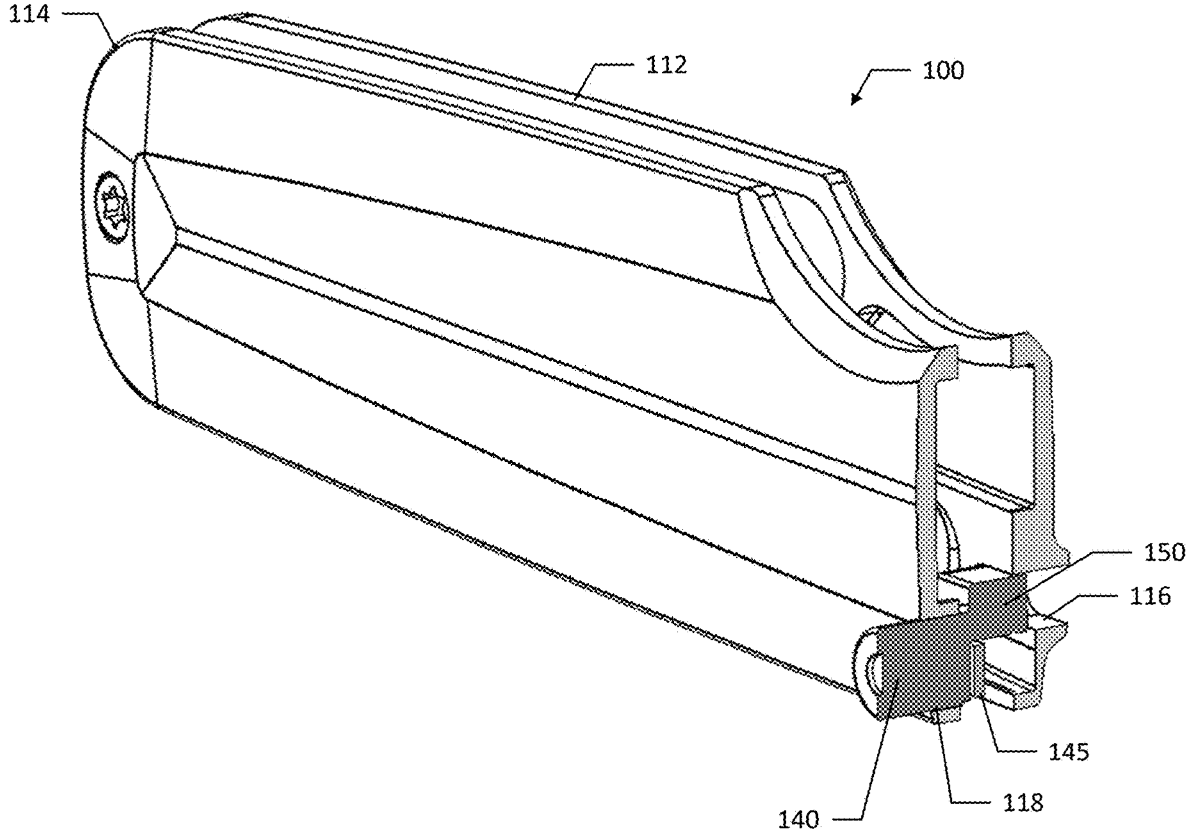
Figure 7:
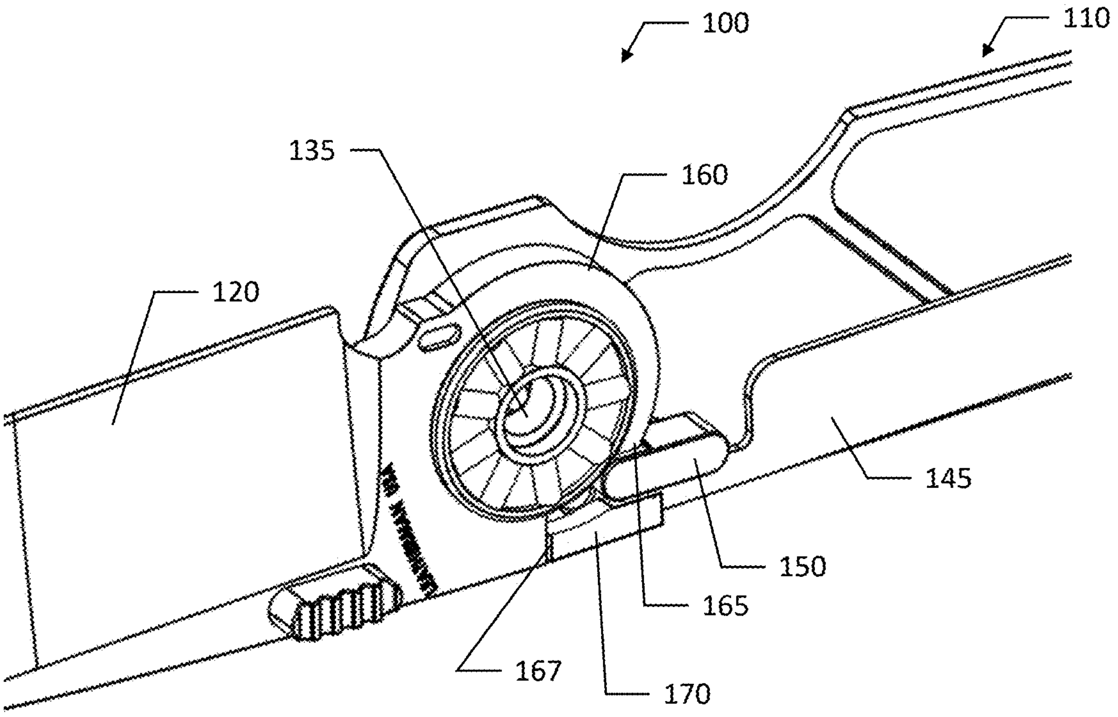
Figure 8:
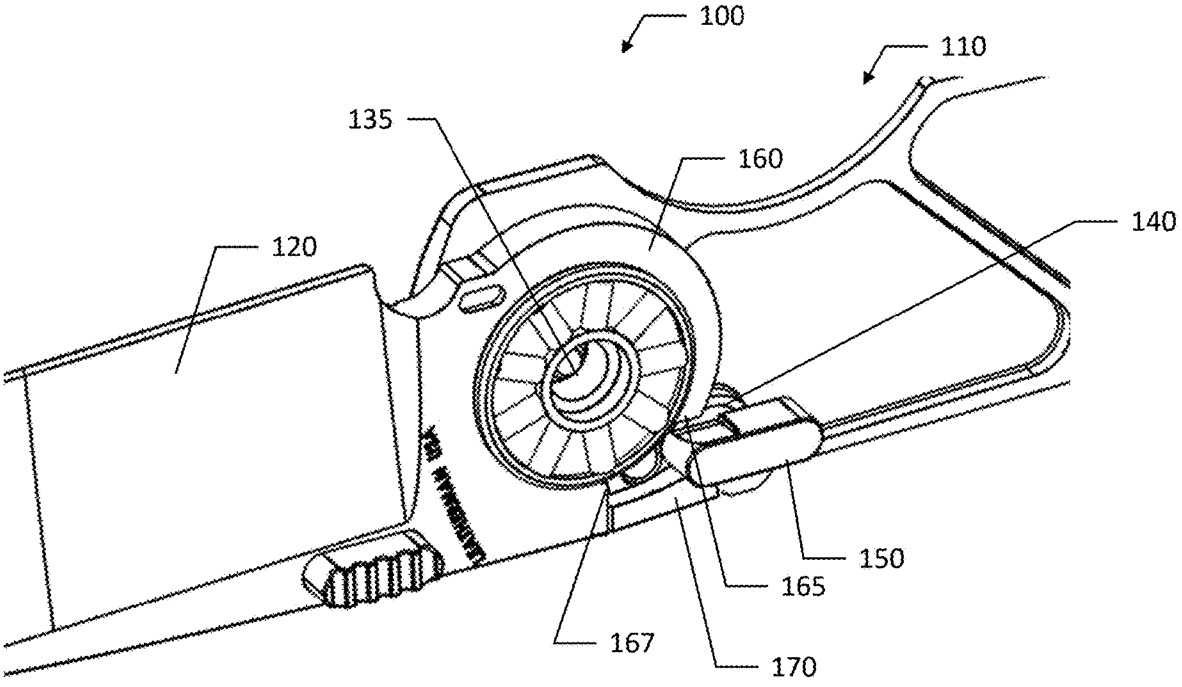
Figure 9:
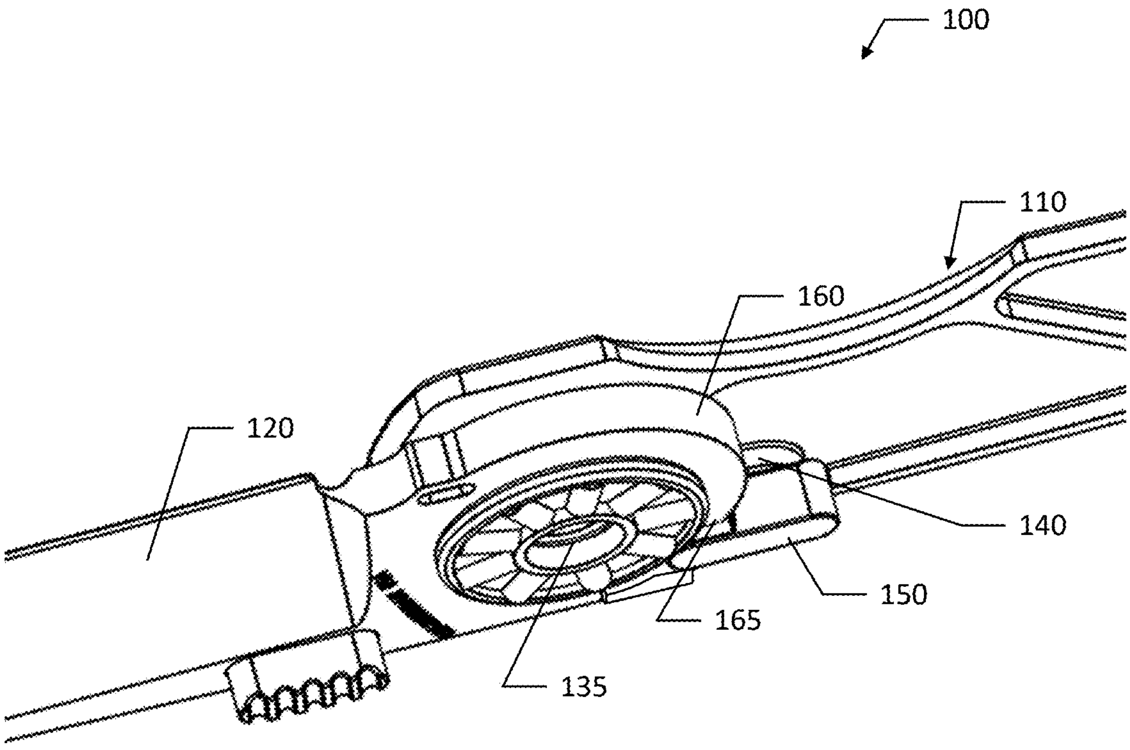
Figure 10:
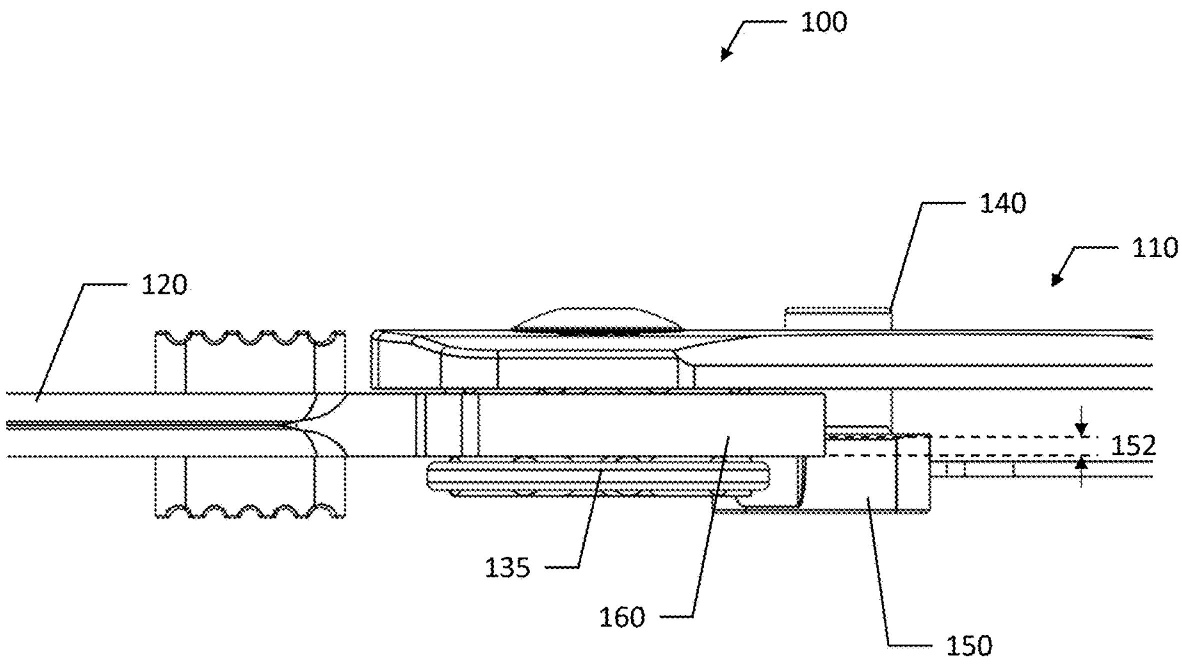
Figure 11:
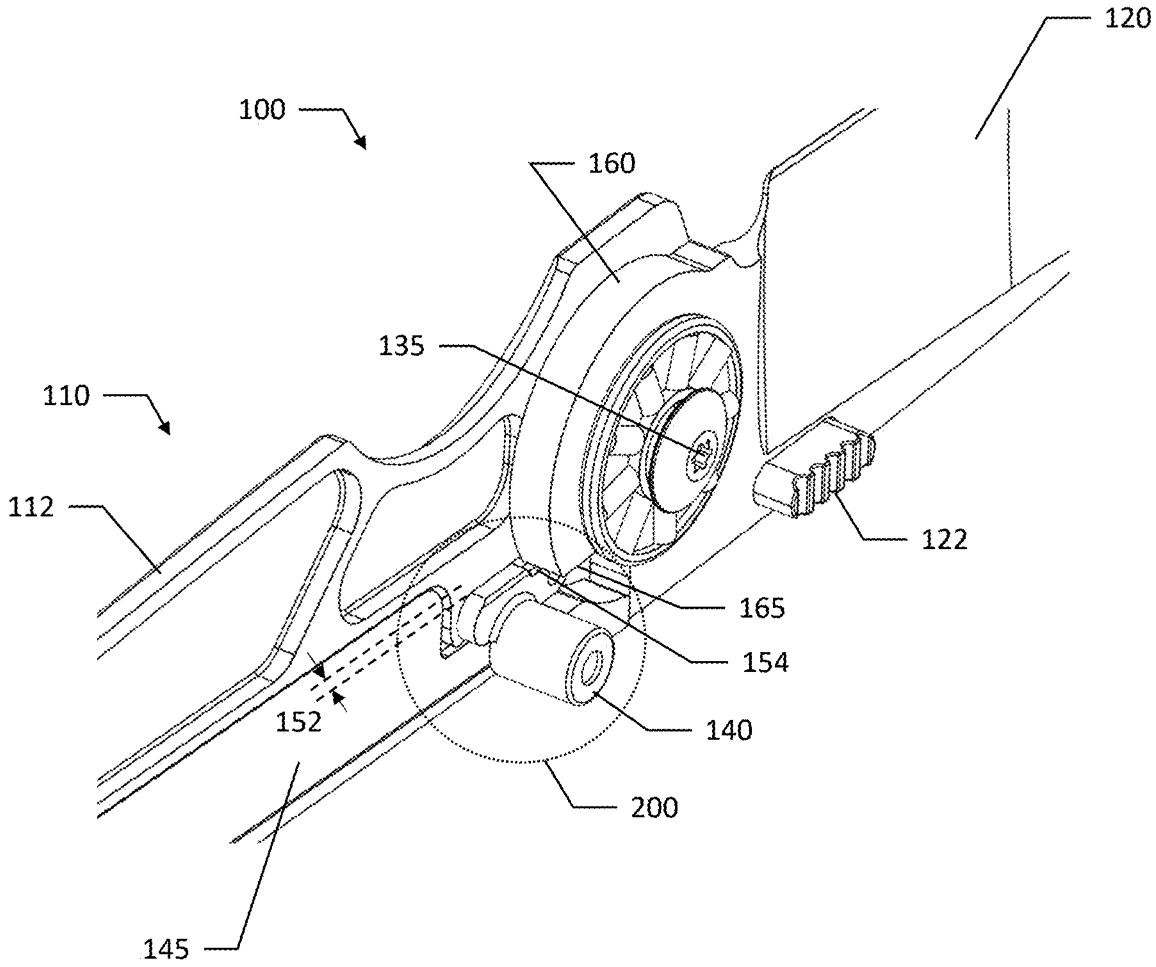
Figure 12:
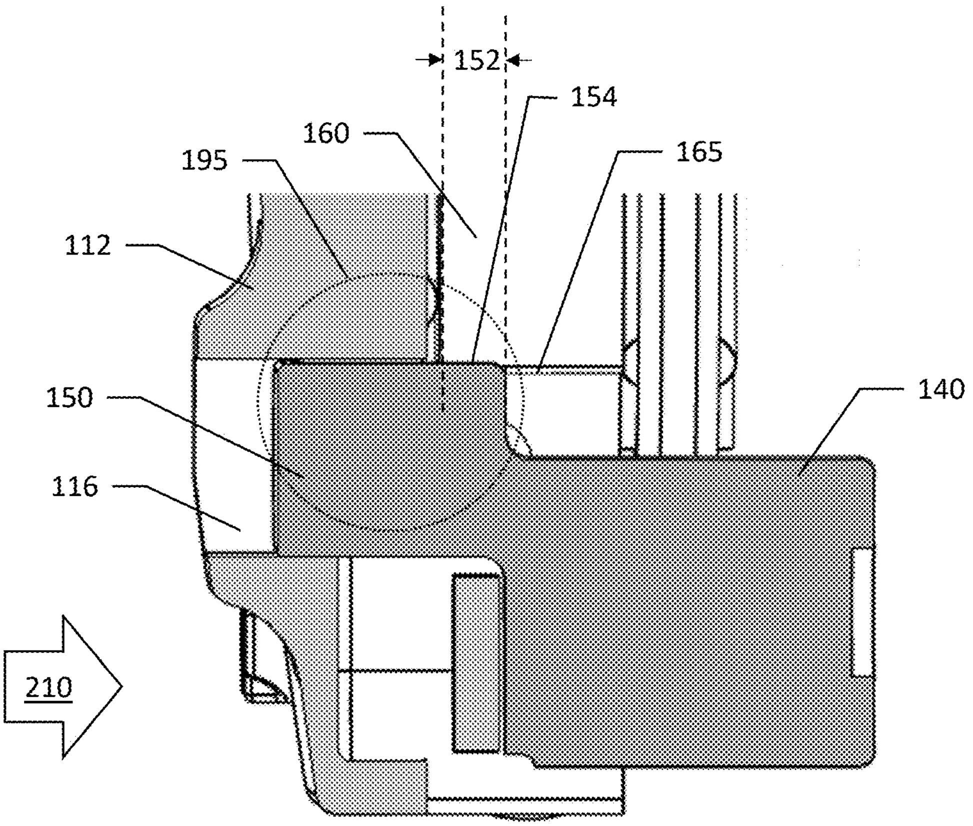
Figure 13:
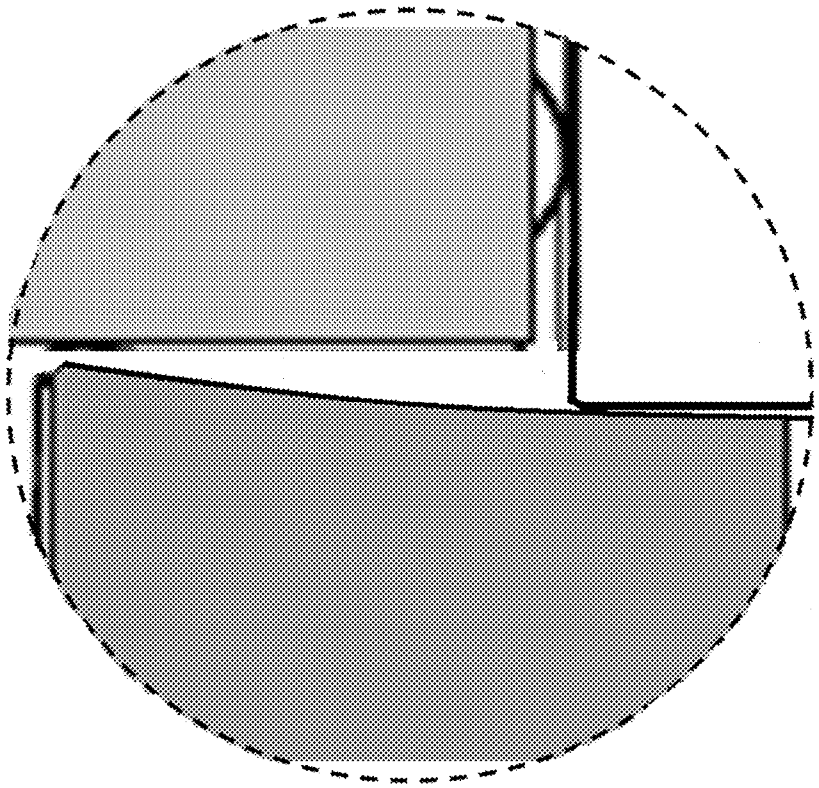
Figure 14:
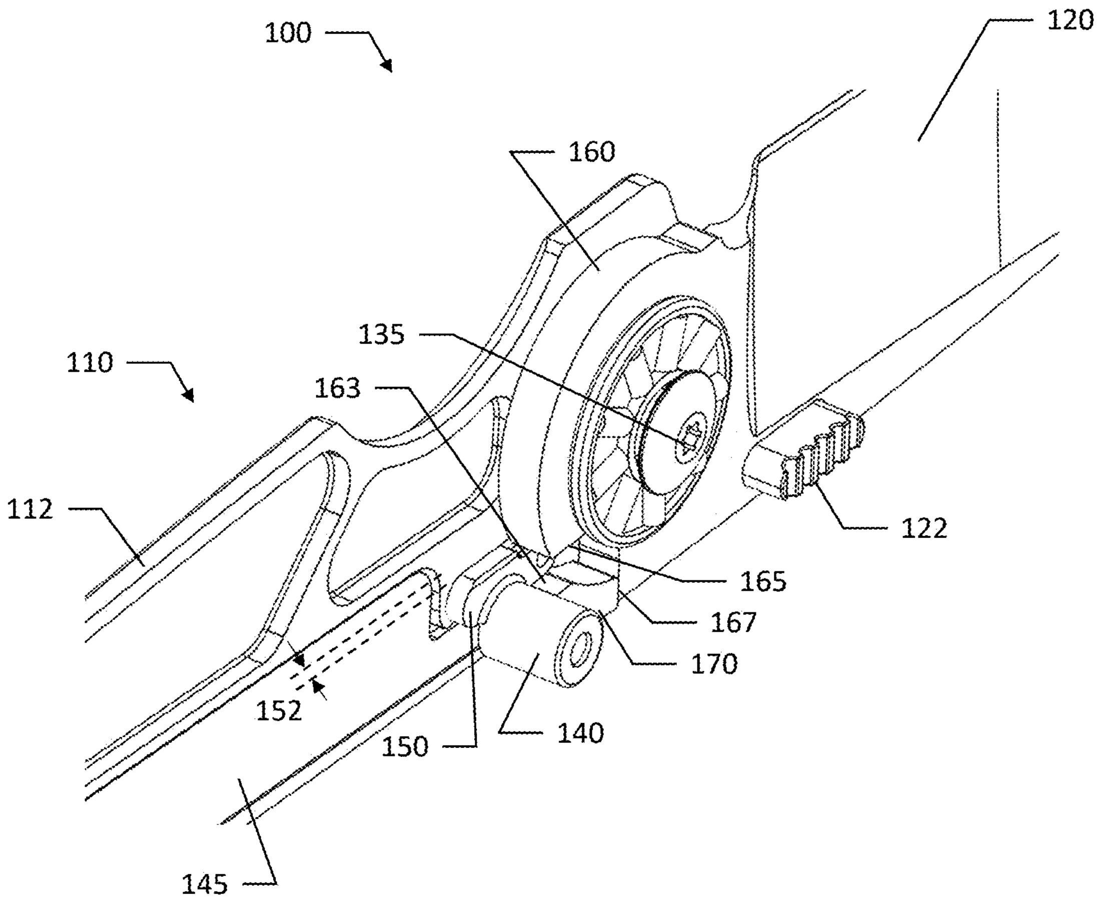
Figure 15:
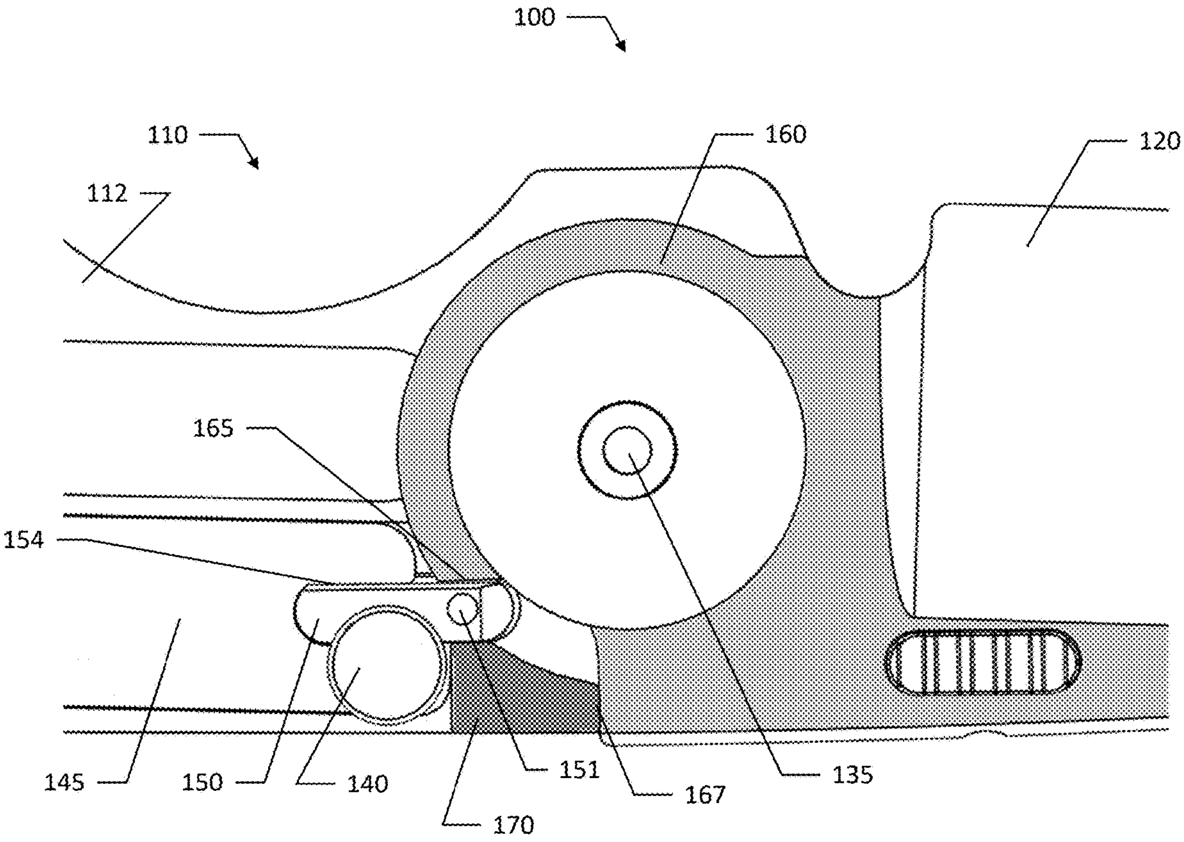
Figure 16:
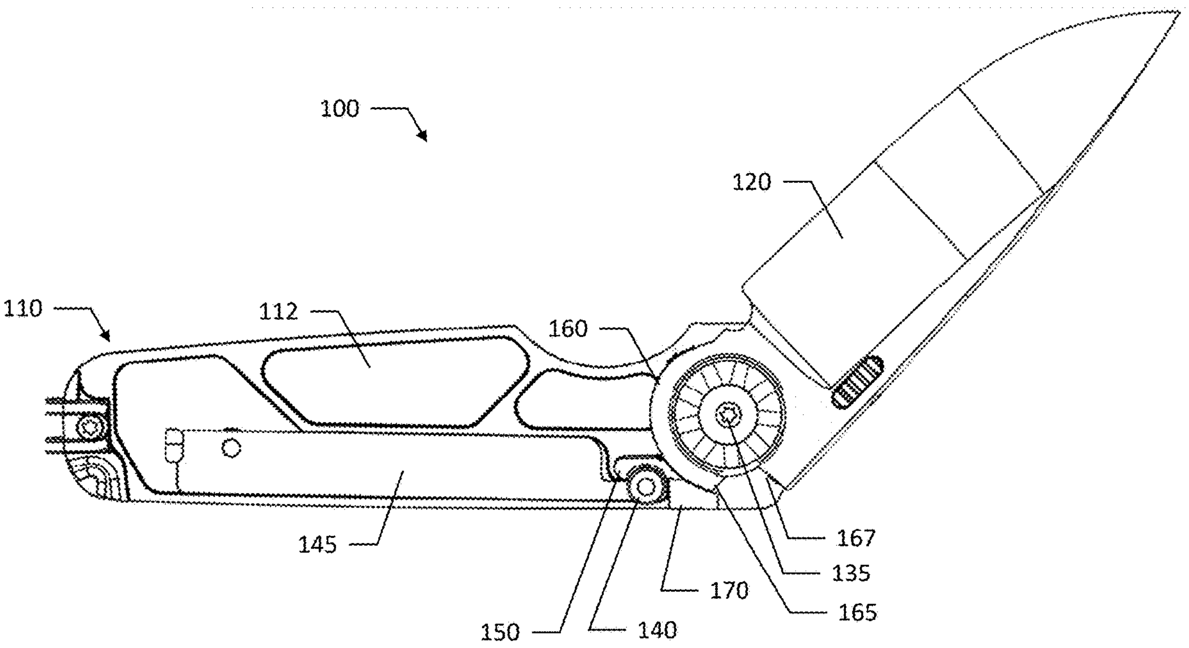
Figure 17:
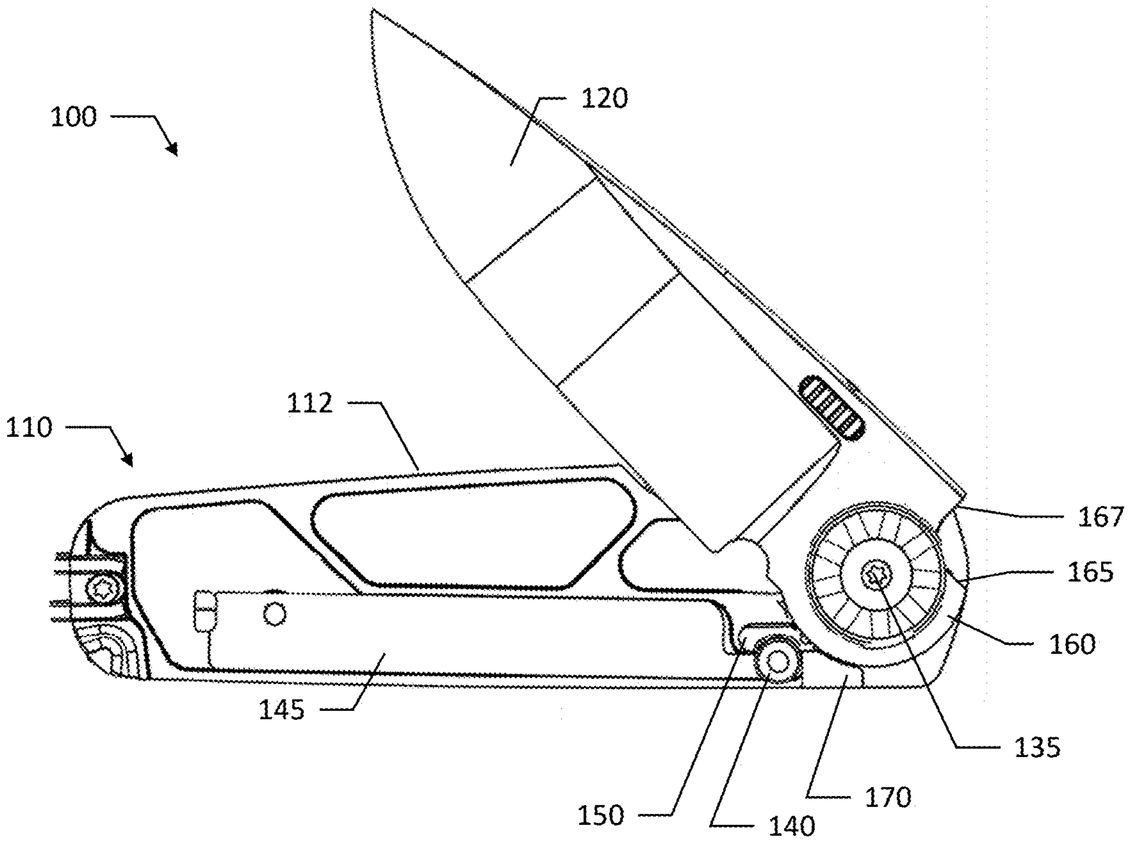
Figure 18:
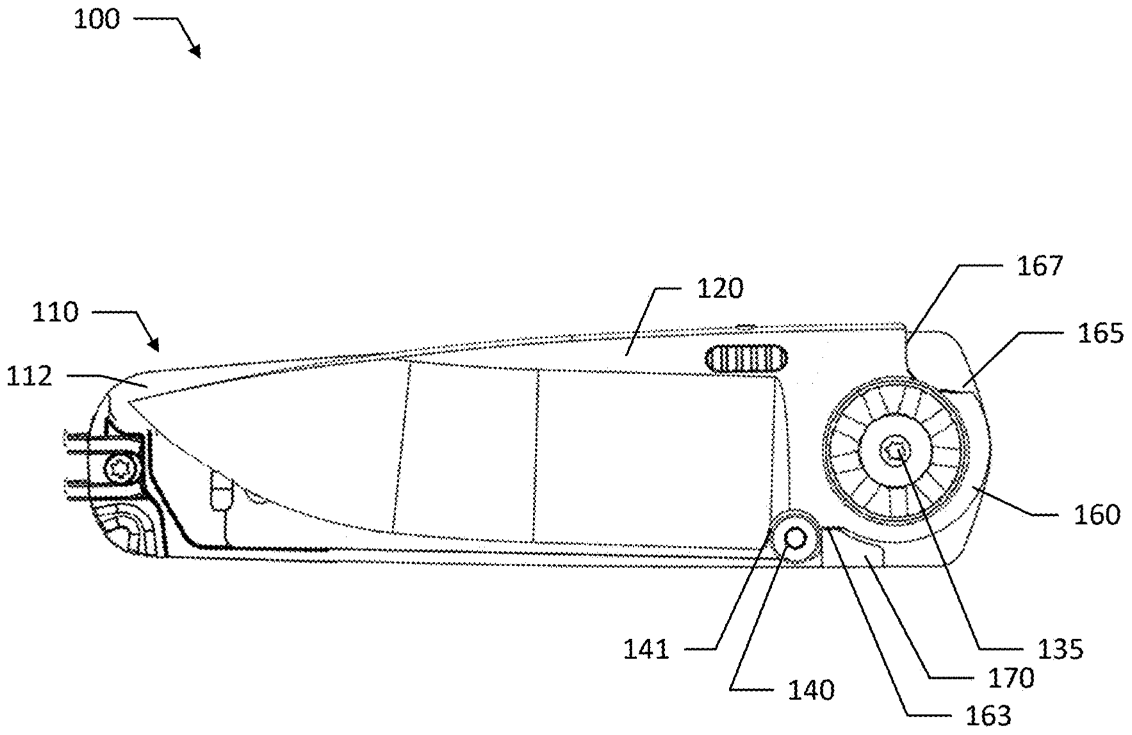
Figure 19:
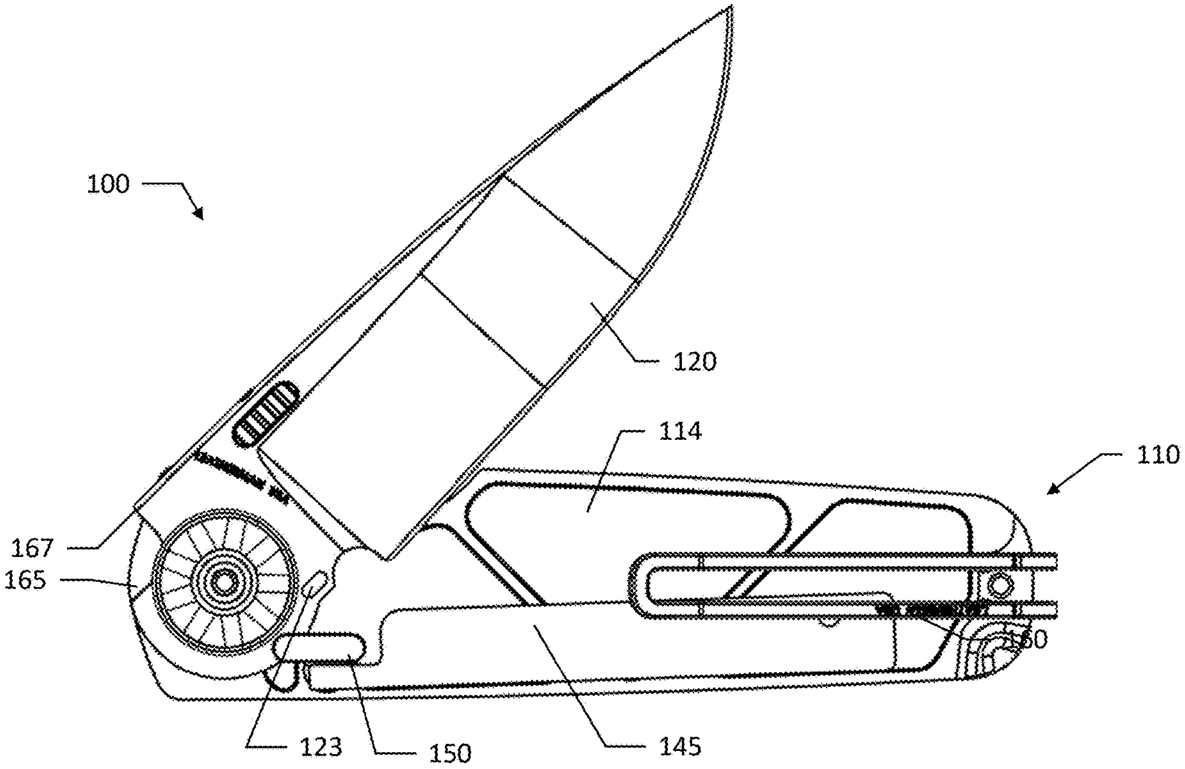
Figure 20:
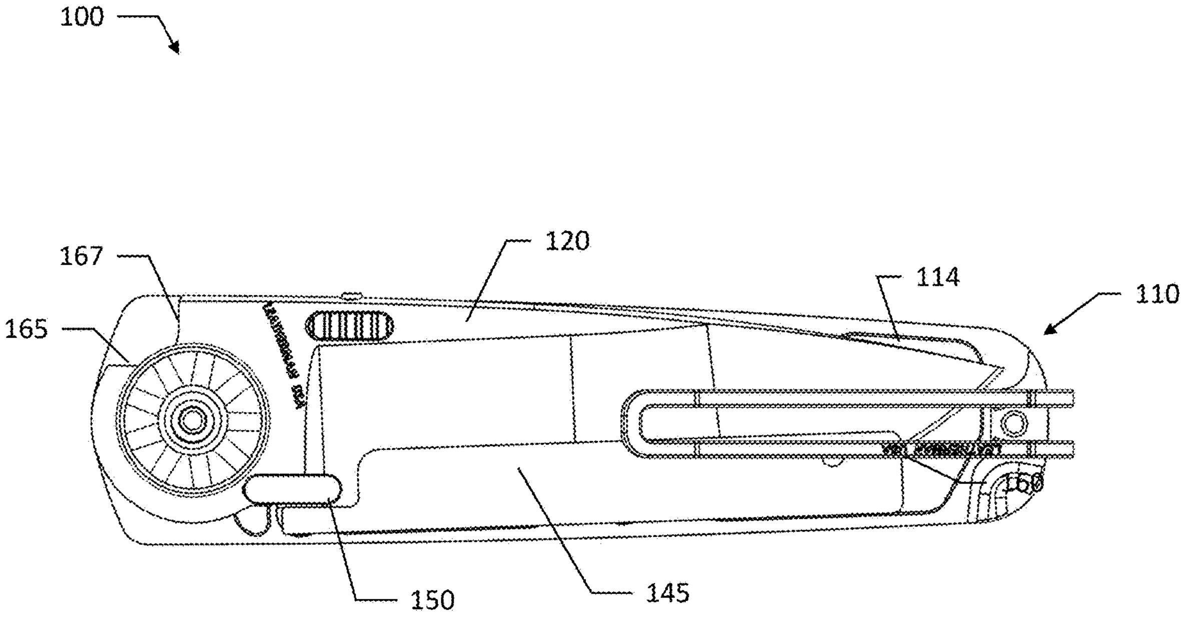
Figure 21:
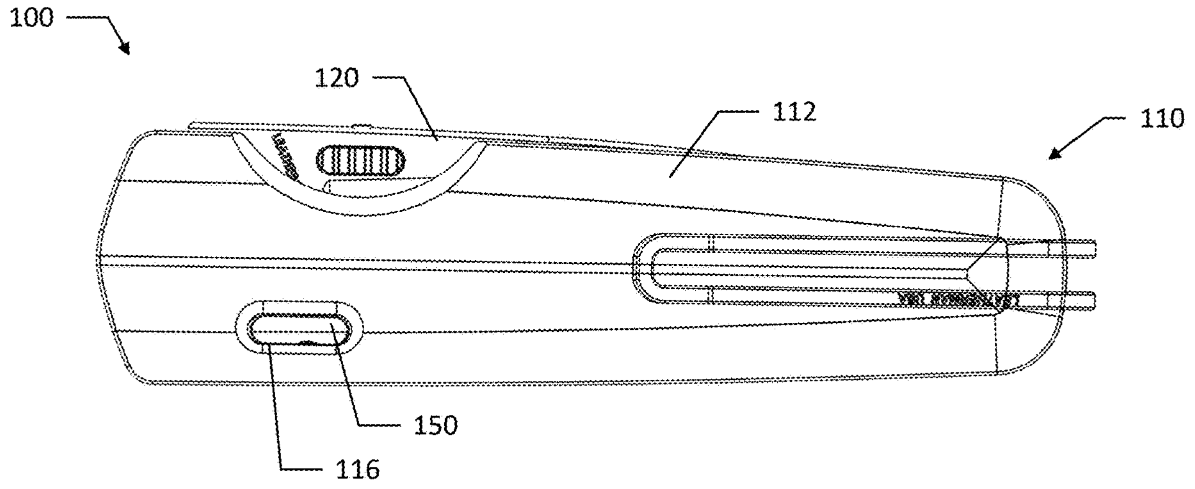

Having thus described embodiments of the invention in general terms, reference will now be made to the accompanying drawings, which are not necessarily drawn to scale, and wherein:

FIG. 1 illustrates a folding tool including a handle portion and a folding blade shown in the deployed position according to an example embodiment of the present disclosure;

FIG. 2 illustrates the folding tool of FIG. 1 with the folding blade shown in the folded, stowed position within the handle portion according to an example embodiment of the present disclosure;

FIG. 3 illustrates the tool of FIGS. 1 and 2 from a different view where a portion of the locking mechanism is visible within the handle portion according to an example embodiment of the present disclosure;

FIG. 4 illustrates a folding tool including a handle portion and a folding blade shown in the deployed position with a piece of the handle portion removed according to an example embodiment of the present disclosure;

FIG. 5 illustrates another view of the folding tool of FIG. 4 according to an example embodiment of the present disclosure;

FIG. 6 illustrates another view of the tool of FIG. 4 in a section view, with the section line taken through a center of the button with the blade omitted according to an example embodiment of the present disclosure;

FIG. 7 illustrates a detail view of the folding tool of FIG. 4 depicting the locking wedge in a locked position according to an example embodiment of the present disclosure;

FIG. 8 illustrates a detail view of the folding tool of FIG. 4 depicting the locking wedge in an unlocked position and the spring omitted for ease of understanding according to an example embodiment of the present disclosure;

FIG. 9 illustrates a detail view similar to that of FIG. 8 with the locking wedge in the locked, engaged position according to an example embodiment of the present disclosure;

FIG. 10 illustrates a top view of a folding tool with the locking wedge in a locked, engaged position according to an example embodiment of the present disclosure;

FIG. 11 illustrates another view of a locking tool including a locking wedge in a locked, engaged position with a locking surface of a folding blade according to an example embodiment of the present disclosure;

FIG. 12 is a detail view of FIG. 11 from a different perspective depicting the engagement between the locking wedge and the locking surface according to an example embodiment of the present disclosure;

FIG. 13 illustrates a detail view of the detail circle of FIG. 12 according to an example embodiment of the present disclosure;

FIG. 14 illustrates a view of a folding tool including a folding blade and a handle portion with a different piece removed for understanding according to an example embodiment of the present disclosure;

FIG. 15 illustrates a detail view of the components used to lock a folding blade securely in a deployed position according to an example embodiment of the present disclosure;

FIG. 16 illustrates a view of a folding tool including a folding blade and a handle with a piece removed and the locking wedge in the unlocked position as the folding blade begins to rotate to the folded, stowed position according to an example embodiment of the present disclosure;

FIG. 17 illustrates the view of FIG. 16 with the folding blade rotated further to the folded, stowed position according to an example embodiment of the present disclosure;

FIG. 18 illustrates the view of FIG. 17 with the folding blade in the folded, stowed position according to an example embodiment of the present disclosure;

FIG. 19 illustrates a view of a folding tool including a folding blade and a handle with a piece removed and the folding blade in a partially closed position according to an example embodiment of the present disclosure;

FIG. 20 illustrates the view of the folding tool of FIG. 19 including a folding blade and a handle with a piece removed and the folding blade in a folded, stowed position according to an example embodiment of the present disclosure; and FIG. 21 illustrates the view of the folding tool of FIG. 20 with the piece of the handle portion replaced according to an example embodiment of the present disclosure.

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a tool 100 such as a knife or multipurpose tool that includes a handle portion 110 and a folding blade 120 is depicted. While the tool 100 will be described in the context of a folding knife, other types of tools may readily employ components of embodiments of the present disclosure including the inclusion of those components by multipurpose tools and other types of tools that are not considered multipurpose tools. For purposes of illustration, but not of limitation, however, a folding knife employing embodiments of the present disclosure will now be described. Thus, while the tool portion of the illustrated embodiment comprises a folding blade 120, the tool 100 can include a wide array of types of tools that can be the tool portion, where the tool portion is capable of being folded about an axis from a deployed position to a stowed position relative to a handle portion 110.

The tool 100 of FIG. 1 includes a handle portion 110, a folding blade 120, and a fastener 130 through an axis of rotation of the folding blade relative to the handle portion. FIG. 2 illustrates the tool 100 of FIG. 1 with the folding blade 120 in the stowed, folded position within the handle portion 110. As shown, the folding blade 120 includes a thumb tab 122 which is received in a recess of the handle portion and enables a user to use the thumb of the hand holding the tool to move the folding blade from the folded, stowed position of FIG. 2 to the open, deployed position of FIG. 1 using only one hand. Folding tools of various embodiments, such as multipurpose tools and folding knives as depicted employ tools, blades, or other components that are movable between a stowed, folded position to a deployed, open position. Components of folding tools including multipurpose tools can include screw drivers, saws, pliers, scissors, can/bottle openers, etc. The folding capability of these components can be employed for a variety of practical purposes. In the case of a multipurpose tool, having the ability to individually unfold and deploy a tool, blade, or other component can enable the use of that deployed component while remaining components can remain in the stowed, folded position within the handle portion. This folding mechanism enables the deployed component to be used without the various other folding components of the multipurpose tool interfering.

In the deployed, unfolded position, the folding blade, such as the folding blade 120 of FIG. 1 relative to the handle portion 110, can be safely used by a user holding the handle portion. The nature of folding blades and tools renders them convenient for a wide variety of functions and implementations. Generally, the component in the deployed, unfolded position is used by a user to accomplish a task that imparts forces on the deployed component. In the instance of a folding blade 120 depicted in FIG. 1, the use may generally involve cutting of a material with the sharp edge 125 of the folding blade.

To improve the safety of use of a folding component, particularly a folding blade of a folding tool, embodiments provided herein include a lock to secure the folding blade in the deployed position. Securing the folding component in the deployed position enables use of the component without concern for unintended folding of the tool, which can compromise the functionality of the component and injure the hand of a user holding the tool. The lock of embodiments described herein is configured to securely lock a component of a tool, such as a blade as illustrated, in a deployed position.

FIG. 3 illustrates the tool 100 of FIGS. 1 and 2 from a different view, where a portion of the locking mechanism is visible within the handle portion 110. The visible components of the locking mechanism include a button 140 and one embodiment of a spring 145 in the form of a leaf spring. Also shown in FIG. 3 are a first handle piece 112 and second handle piece 114 of the handle portion. The first handle piece 112 and second handle piece 114 are on opposite sides of the handle portion 110 and are the parts of the handle portion gripped by a user when using the tool 100. The first handle piece 112 and second handle piece 114 define between them a cavity of the tool 100, wherein one or more tools, blades, or components of a tool or multipurpose tool may be disposed when in the folded, stowed position.

FIG. 4 illustrate the tool 100 of FIGS. 1-3 with the second handle piece 114 of FIG. 3 removed and viewed from a side in which the button 140 is facing. As such, only a portion of the button 140 is visible. The button 140 of the illustrated embodiment may be attached to or formed with the locking wedge 150, and the locking wedge and button may be secured to the spring 145. The removal of the second handle piece 114 along with omission of various parts in the following drawings is for visibility of various parts of the tool and better understanding of the operation of the illustrated parts. Also shown in FIG. 4 is the axis 135 about which the folding blade 120 rotates between the folded, stowed position and the depicted deployed position.

The spring 145 is depicted as a leaf spring secured to a chassis of the handle portion 110 and/or to the first handle piece 112 or second handle piece 114. The spring 145 may be attached to a component of the handle portion 110 with or without the use of fasteners. In the illustrated embodiment, two locating features are illustrated which serves to secure the spring 145 within the handle portion 110 and preclude rotation of the spring within the handle portion 110. The illustrated locating features include a lug 147 and a stop 148. The lug 147 provides a locating mechanism for locating the spring 145 within the handle portion 110, while the stop 148 prevents any relative movement between the spring 145 and the lug 147 or the stop 148. The spring 145 of the illustrated embodiment is a separate piece from the handle portion 110, though in some embodiments a leaf spring may be integral to the frame and formed from a piece of the handle portion 110. The spring of example embodiments can also be a coil spring, such as a coil spring disposed within or attached to the button 140.

Also visible within FIG. 4 is the locking wedge 150. The locking wedge 150 is configured to engage at least a portion of a locking surface 165 of a cam portion 160 of the blade 120. The spring 145 serves to bias the locking wedge 150 toward a locked position where the locking wedge 150 engages a locking surface of the cam portion 160. The locking surface is substantially parallel to the axis 135. The button 140 is used to push against the bias of the spring and to move the locking wedge 150 out of contact with the locking surface of the cam portion 160.

FIG. 5 illustrates another view of the tool 100 of FIG. 4. As shown from a different angle, the locking wedge 150 and button 140 are integrally formed, and in contact with the spring 145. The spring biases the locking wedge 150 and button 140 into engagement with the cam portion 160. The blade 120, in the deployed position, engages the locking wedge 150 at the locking surface 165 of the cam portion 160. The locking wedge 150 becomes "wedged" between the locking surface 165 and a stop surface 163 of abutment 170. Also when the blade 120 is in the open, deployed position, a stopping surface 167 of the blade engages another surface of the abutment 170. In this manner, the blade is precluded from rotating about axis 135 in a clockwise direction by the stopping surface 167 of the blade engaging the abutment 170, and precluded from rotating about the axis in a counter-clockwise direction by the locking surface 165 of the cam portion 160 engaging the locking wedge 150, and the locking wedge 150 being wedged between the locking surface 165 and the stop surface 163 by the abutment 170.

According to some embodiments, the locking wedge 150 can be secured to the button 140, such as by a fastener. In other embodiments the button 140 is integrally formed with the locking wedge 150. When the button 140 is integrally formed with the locking wedge 150, the alignment between them is precise. Further, the button 140 and locking wedge 150 integrally formed together form a larger component that is able to float within the handle portion as described further below, where the integrally formed button 140 and locking wedge 150 are not attached to other components.

As shown in FIG. 6, which is another view of the tool 100 in a section view, with the section line taken through a center of the button 140 with the blade 120 omitted. As depicted, the locking wedge 150 and button 140 can float between the first handle piece 112 and the second handle piece 114, with portions of one or both handle pieces forming a channel within which the button 140 and locking wedge 150 can move, while the locking wedge 150 is held between the first handle piece 112 and second handle piece 114. A first aperture 116 in the first handle piece 112 can receive and align the locking wedge 150, while a second aperture 118 in the second handle piece 114 can receive and align the button 140. This arrangement both captures the connected locking wedge 150 and button 140 within the handle portion, but also enables the floating of the components while maintaining proper alignment. The spring 145 is illustrated biasing the button toward the second handle piece 114, where the locking wedge 150 is in position to engage the locking surface 165 of the cam portion 160 of the blade.

FIG. 7 illustrates another view of the tool 100 shown in FIG. 4 with the first handle piece 112 removed. As shown, the spring 145 biases the locking wedge 150 is in a locked position in contact with the locking surface 165 of the cam portion 160 of the folding blade 120. The locking wedge 150 is engaged in the locked position between the locking surface 165 and abutment 170. The abutment 170 also engages stopping surface 167 of the cam portion 160 such that the blade in the illustrated embodiment of FIG. 7 is precluded from clockwise rotation by the locking wedge 150 which is also pressed against the abutment and precluded from counterclockwise rotation by the stopping surface 167 engaging the abutment 170. With the locking wedge 150 in this locked position, the folding blade 120 cannot be rotated about axis 135 from the illustrated deployed position to the folded, stowed position.

FIG. 8 illustrates the locking wedge 150 in the unlocked position with the button pressed to drive the locking wedge 150 against the spring bias of the spring to the unlocked position, with the spring 145 removed for ease of understanding. However, visible in FIG. 8 is the button 140 which is used to press the spring 145 against its biasing force to move the locking wedge from the locked position, where the locking wedge 150 engages the locking surface 165 of the cam portion 160 of the folding blade 120. The spring 145 biases the lock wedge toward the cam portion 160 of the folding blade 120 such that when the folding blade is in the deployed position, the spring 145 pushes the locking wedge 150 to engage the locking wedge with the locking surface 165.

FIG. 9 illustrates the components shown in FIG. 8 with the locking wedge 150 engaging the locking surface 165 of the cam portion 160 of the folding blade 120. As shown, the locking wedge 150 engages the locking surface 165 and precludes rotation of the folding blade 120 about the axis 135 in the clockwise direction (of the view of FIG. 8) toward the folded, stowed position. This locking mechanism maintains the folding blade 120 in the deployed position for effective and safe use.

FIG. 10 illustrates a top view of the arrangement of components of FIG. 9 with the locking wedge 150 in the locked position relative to the cam portion 160 of the folding blade 120. As depicted, there is a degree of overlap 152 between the locking wedge 150 and the cam portion 160. This overlap provides the locking function of the locking mechanism described herein. FIG. 11 illustrates a different view of the locking mechanism with the handle portion removed. As shown, the locking wedge 150 is engaged in a locked position with the locking surface 165 of the cam portion 160 of the folding blade. The degree of overlap 152 is also illustrated by the broken lines. Also shown is thumb tab 122 of the folding blade 120, which can be used to move the blade from the folded, stowed position to the deployed position with the use of only one hand in some embodiments.

The locking wedge 150 described herein includes a specifically shaped top surface 154 that enables secure engagement between the top surface 154 of the locking wedge and the locking surface 165 of the cam portion 160 of the folding blade. According to an example embodiment, the locking surface 165 and cam portion 160 can be specified with dimensional tolerances that are well within manufacturing capabilities of readily available machine tools, such that the locking mechanism can be readily produced at a reasonable cost. The configuration of the top surface 154 of the locking wedge 150 enables these cost-effective tolerances on the cam portion 160.

The components within detail circle 200 of FIG. 11 are illustrated enlarged in FIG. 12. As shown, the locking wedge 150 is in the locking position relative to locking surface 165 of the cam portion 160 of the folding blade. The top surface 154 overlaps with the locking surface by a length shown as overlap 152. Arrow 210 illustrates the direction of the biasing force of the spring 145 shown in FIGS. 3-5. Also shown in FIG. 12 is the aperture 116 through the first handle piece 112 configured to receive and align the locking wedge 150 therein, such that the aperture 116 permits greater lateral travel of the locking wedge and the button 140 than if the locking wedge were confined between the first handle piece 112 and the second handle piece 114. The aperture 116 can further enable the locking wedge 150 to be "floating" within the handle portion 110, as the aperture can align the locking wedge and restrict movement in directions other than parallel to the axis of rotation of the folding tool.

According to some embodiments, the button 140 may be integrally attached to the locking wedge 150 such that a biasing force applied to the button 140, such as with a leaf spring or coil spring, conveys the biasing force to the locking wedge. Alternatively, the spring, such as leaf spring 145, may be attached to the locking wedge, such as with a fastener, to bias the locking wedge directly.

According to the illustrated embodiment of FIG. 12, a portion of the top surface 154 of the locking wedge that engages the locking surface 165 is an arcuate surface. The portion of the top surface 154 of the locking wedge 150 that is not arcuate serves, in part, to maintain alignment of the locking wedge 150 within aperture 116. According to an example embodiment, a cam portion 160 of a folding blade 120 may be around ⅛th inch or 0.125 inches, such that the locking surface may be of around the same width. FIG. 12 also includes detail circle 195, where FIG. 13 illustrates a detail view of detail circle 195.

The illustrated example of FIG. 13 is one embodiment of how the locking wedge may be configured; however, the top surface can be configured with an arced surface of various radii and/or a straight, angled surface. According to the illustrated embodiment of FIG. 13, the locking wedge may include an arcuate surface having a radius of about ⅞th inch or 0.875 inches. In this way, the angle of slope of the top surface 154 is 0.6 degrees at an entry point to the locking wedge 150 top surface 154, 6.1 degrees at 0.6 inches from the entry point, and 12.6 degrees at 0.125 inches from the entry point. The slope of the arcuate top surface 154 permits greater flexibility in tolerances of the cam portion 160 of the folding blade 120 as explained further below. The arc of the locking wedge 150 top surface 154 more effectively engages the locking surface 165 at a range of engagement depths. Provided the coefficient of friction is greater than a sine of the angle of the top surface 154, the locking surface 165 should maintain engagement in the locked position. The top surface 154 can be of a higher friction material or texture to aid the locking mechanism.

According to another embodiment, the arced surface may include a straight section, such as at an entrance to the arced surface, where the straight section is, for example, sloped at 3.3 degrees. Such an angle corresponds to an angle whereby frictional engagement between the locking wedge 150 and the locking surface 165 always exceeds the force component in a direction causing the lock to move relative to the blade. Adding such a straight section can improve clearance for the locking wedge 150 to engage the locking surface 165 without reducing performance of the locking mechanism.

FIG. 14 illustrates the tool 100 of the embodiments described above from a different perspective, with the second piece 114 of the handle portion 110 removed and the first handle piece 112 of the handle portion present. The folding blade 120 is depicted in the deployed position. Visible in the view of FIG. 14 is the locking wedge 150, spring 145, and button 140. Also visible is the abutment 170 configured to engage the stopping surface 167 of the folding blade 120. The abutment 170 of an example embodiment is integrally formed with the first handle piece 112. The integral formation of the abutment 170 with the first handle piece 112 provides strength to the mechanism which locks and holds the blade 120 in the deployed position, which improves safety of use of the blade.

FIG. 15 depicts another view of the aforementioned components in a plan view, with the cam portion 160 of the folding blade 120 and the abutment 170 shaded for ease of discerning between parts described herein. Also visible in the view of FIG. 15 is a detent ball 151 or raised element positioned on the locking wedge 150, the purpose of which is further described below. As shown, the folding blade 120 is in the deployed position locked using the locking wedge 150. The blade rotates clockwise from the stowed position to reach the deployed position illustrated. When the folding blade 120 is fully deployed, the stopping surface 167 of the folding blade 120 engages a surface of the abutment 170. This engagement prevents the folding blade 120 from rotating any further in the clockwise direction. When the stopping surface 167 engages the abutment 170, the bias of spring 145 drives the locking wedge 150 into engagement, along the top surface 154 with the locking surface 165 of the cam portion 160. The arcuate top surface 154 of the locking wedge 150 ensures a secure engagement with the locking surface 165 while the stopping surface 167 engages the abutment 170. This provides for locking the folding blade 120 in the deployed position with virtually no play in the blade about the axis 135 of rotation.

Manufacturing tolerances of interfacing components generally correlate strongly with cost of manufacturing. Maintaining very tight tolerances can be costly in terms of both the precision machinery required and potential for a higher defect rate leading to scrap. Embodiments described herein avoid such very tight tolerances as the design is resilient to tolerances that are more readily achieved and can be achieved at generally lower costs that high-precision, tight tolerances. The locking wedge 150 of example embodiments avoids requiring such high-precision, tight on the folding blade 120 and the cam portion 160 thereof. This flexibility is in part based on the arcuate top surface 154. The arcuate top surface 154 securely engages the locking surface 165 at varying degrees of overlap 152. A nominal design parameter of the position of the locking surface 165 on the cam portion 160 of the folding blade 120 may be configured to engage the arcuate surface at around half of a width of the cam portion 160, which may be for example 0.06 inches. An engagement overlap 152 of 0.06 inches engages an arcuate top surface 154 having a radius of 0.625 inches at a position where the surface has an angle of 6.1 degrees. If the position of the locking surface 165 changes within a reasonable tolerance (e.g., based on a formed position of the locking surface 165 or of the stopping surface 167), the locking surface 165 will still obtain sufficient purchase on the locking wedge 150 top surface 154.

According to some embodiments, an aperture may be present through the first handle piece 112 of the handle portion 110 to provide access to the locking wedge 150. In this way, a user may be able to access and press the locking wedge 150 further into engagement with the locking surface 165. The aperture may include a button that a user may press to drive the locking wedge further into engagement with the locking surface 165 to further improve the degree of overlap 152 and to further pinch the folding blade between the locking wedge 150 and the abutment 170. The aperture additionally provides clearance for a maximum amount of lock travel within the combined handle portion thickness as the aperture allows the combined locking wedge 150 and button 140 to travel a greater distance than if they were limited by the first handle piece 112 an second handle piece 114.

Having described the locking mechanism above, the release of the locking mechanism is described herein. As noted above, pressing button 140 drives the spring against its bias force and pushes the locking wedge 150 out of engagement with the locking surface 165. This position is illustrated, for example, in FIG. 7. Once the locking wedge 150 has been driven to the unlocked position, the folding blade 120 may be rotated about axis 135 toward the closed position as shown in FIG. 16. As shown, the locking surface 165 is able to clear the locking wedge 150. Once the locking surface has at least partially cleared the locking wedge 150, the button 140 no longer needs to be pressed to continue the closing motion, as the bias of the spring 145 presses the locking wedge against the cam portion 160 of the folding blade, where the locking wedge can ride along the cam portion during the closing motion.

FIG. 17 illustrates the folding blade 120 rotated further about axis 135 toward the folded, stowed position which is depicted in FIG. 18. The folding blade 120 of the illustrated embodiment includes a recess 141 to accommodate the button 140 and a stop surface 163 which engages the abutment 170 to prevent over rotation of the folding blade 120 past the closed position which may compromise the sharpness of the blade if it were allowed to contact a bottom of a cavity in which it is received in the folded, stowed position.

FIG. 19 illustrates the tool 100 in the same position as found in FIG. 17 with the folding blade 120 partially closed from the opposite side of the tool with the first handle piece

112 of the handle portion 110 removed. The locking wedge 150 of an example embodiment includes a retaining feature, where the retaining feature engages the folding blade 120 to hold and secure the folding blade in the folded, stowed position. According to the illustrated embodiment, the folding blade includes a detent 123, while the locking wedge 150 includes a retaining feature in the form of a detent ball 151 as illustrated in FIG. 15. Upon rotating the folding blade 120 to the folded, stowed position as shown in FIG. 20, the detent ball 151 of the locking wedge 150 is received into the detent 123 to hold the folding blade in the stowed position.

FIG. 21 illustrates the tool 100 with the handle portion 110 intact and the folding blade 120 in the stowed, folded position within a cavity within the handle portion. Also shown is aperture 116 through the first handle piece 112 of the handle portion 110 as described above. The aperture 116 provides access, either directly or indirectly, to the locking wedge 150 such that a user can press the locking wedge further into engagement with a locking surface of the folding blade 120 as appropriate and permits greater travel of the locking wedge 150 and button 140.

While the illustrated embodiments of FIGS. 1-18 are primarily directed to a folding knife tool, the folding and locking mechanism described herein can be employed for a wide array of folding tools since the mechanism functions regardless of what type of tool on which embodiments are employed including, for example, non-folding tools.

Embodiments provided herein include a tool including: a handle portion; a folding tool portion, wherein the folding tool portion is configured to be rotatable about a folding tool axis between a folded, stowed position at least partially within the handle portion, and a deployed position substantially outside of the handle portion, where the folding tool portion comprises a cam portion disposed about the folding tool axis, where the cam portion defines a locking surface; and a locking element, wherein the locking element is configured to engage the locking surface of the folding tool portion in response to the folding tool portion moving to the deployed position, where the locking element is spring biased by a spring in a direction parallel to the folding tool axis, and where the locking element defines at least one of an arcuate surface or a wedge surface for engaging the locking surface of the folding tool portion.

The handle portion of some embodiments defines a first handle piece and a second handle piece, where the first handle piece defines a first aperture, where the locking element is aligned with and guided by the first aperture. The tool of some embodiments further includes a button, where the button is at least one of attached to the locking element or integrally formed with the locking element, where the button is configured to drive the locking element against spring bias to disengage the locking element from the locking surface. The button of some embodiments defines a central button axis extending therethrough parallel to the folding tool axis, where the locking element defines a central locking element axis parallel to the folding tool axis, and where the central button axis and the central locking element axis are offset from one another.

According to some embodiments the second handle piece defines a second aperture, where the button is aligned with and guided by the second aperture. The button and the locking element of some embodiments are not mechanically coupled to the handle portion or the spring. According to some embodiments the locking element defines a detent ball, where the cam portion defines a recess, where in the folded, stowed position the detent ball engages the recess and holds the folding tool portion in the folded, stowed position. The handle portion of some embodiments includes an abutment, and the folding tool portion comprises a stopping surface defined by the cam portion, where in the deployed position, the folding tool portion is secured rotationally about the folding tool axis in a first direction by the locking element engaging the locking surface and in a second direction by the stopping surface engaging the abutment. According to some embodiments in the deployed position the locking element is held between the locking surface of the folding tool portion and a stop surface of the abutment. According to some embodiments the handle portion includes a first handle piece and a second handle piece, wherein the abutment is integrally formed with the first handle piece.

Embodiments provided herein include a tool including: a handle portion; a folding tool portion, where the folding tool portion is configured to be rotatable about a folding tool axis between a folded, stowed position at least partially within the handle portion, and a deployed position substantially outside of the handle portion, where the folding tool portion includes a cam portion disposed about the folding tool axis, where the cam portion defines a locking surface and a stopping surface where in the deployed position the stopping surface of the cam portion engages an abutment integrally formed within the handle portion; and a locking element, where the locking element is configured to engage the locking surface of the cam portion in response to the folding tool portion moving to the deployed position, where the locking element is spring biased by a spring in a direction parallel to the folding tool axis.

According to some embodiments the locking element defines at least one of an arcuate surface or a wedge surface for engaging the locking surface of the folding tool portion. The handle portion of some embodiments defines a first aperture therein, wherein the locking element is aligned with and guided by the first aperture. The tool of an example embodiment further includes a button, where the button is at least one of attached to the locking element or integrally formed with the locking element, where the button is configured to drive the locking element against spring bias to disengage the locking element from the locking surface.

According to some embodiments the button defines a central button axis extending therethrough parallel to the folding tool axis, where the locking element defines a central locking element axis parallel to the folding tool axis, and where the central button axis and the central locking element axis are offset from one another. The handle portion of an example embodiment defines a first handle piece and a second handle piece, where the first handle piece defines a first aperture, where the second handle piece defines a second aperture, where the locking element is aligned with and guided by the first aperture, and where the button is aligned with and guided by the second aperture. The locking element of some embodiments defines a detent ball, wherein the cam portion defines a recess, wherein in the folded, stowed position the detent ball engages the recess and holds the folding tool portion in the folded, stowed position.

Embodiments described herein include a tool including: a handle portion; a folding tool portion, where the folding tool portion is configured to be rotatable about a folding tool axis between a folded, stowed position at least partially within the handle portion, and a deployed position substantially outside of the handle portion, where the folding tool portion includes a cam portion disposed about the folding tool axis, where the cam portion defines a locking surface; and a locking element, where the locking element is configured to engage the locking surface of the cam portion in response to the folding tool portion moving to the deployed position;

and a button, where the button is at least one of attached to the locking element or integrally formed with the locking element, where the button is configured to drive the locking element against spring bias to disengage the locking element from the locking surface According to some embodiments the locking element and button are spring biased by a spring in a direction parallel to the folding tool axis. The button of some embodiments defines a central button axis extending therethrough parallel to the folding tool axis, where the locking element defines a central locking element axis parallel to the folding tool axis, and where the central button axis and the central locking element axis are offset from one another. According to some embodiments the handle portion defines a first handle piece and a second handle piece, where the first handle piece defines a first aperture, where the second handle piece defines a second aperture, where the locking element is aligned with and guided by the first aperture, and where the button is aligned with and guided by the second aperture.

According to certain embodiments the locking element defines a detent ball, where the cam portion defines a recess, where in the folded, stowed position the detent ball engages the recess and holds the folding tool portion in the folded, stowed position. The locking element of some embodiments defines at least one of an arcuate surface or a wedge surface for engaging the locking surface of the folding tool portion, where the at least one of the arcuate surface or the wedge surface defines a texture having a higher coefficient of friction than a smooth surface.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A tool comprising:

a handle portion comprising an abutment defining a first stop surface and a second stop surface;

a folding tool portion, wherein the folding tool portion is configured to be rotatable about a folding tool axis in a first direction from a folded, stowed position at least partially within the handle portion to a deployed position substantially outside of the handle portion, wherein the folding tool portion comprises a cam portion disposed about the folding tool axis, wherein the cam portion defines a locking surface; and a locking element, wherein the locking element is configured to engage the locking surface of the folding tool portion and become wedged between the first stop surface of the abutment and the locking surface of the folding tool portion in response to the folding tool portion moving to the deployed position, wherein in the deployed position, the folding tool portion is precluded from rotating in the first direction about the folding tool axis by engaging in the second stop surface of the abutment, and precluded from rotating in a second direction about the folding tool axis, opposite the first direction, by the locking element engaging the locking surface of the folding tool portion, wherein the locking element is spring biased by a spring in a direction parallel to the folding tool axis, and wherein the locking element defines at least one of an arcuate surface or a wedge surface for engaging the locking surface of the folding tool portion.

2. The tool of claim 1, further comprising a button, wherein the button is at least one of attached to the locking element or integrally formed with the locking element, wherein the button is configured to drive the locking element against spring bias to disengage the locking element from the locking surface.

3. The tool of claim 2, wherein the button defines a central button axis extending therethrough parallel to the folding tool axis, wherein the locking element defines a central locking element axis parallel to the folding tool axis, and wherein the central button axis and the central locking element axis are offset from one another.

4. The tool of claim 2, wherein the handle portion defines a first handle piece and a second handle piece, wherein the first handle piece defines a first aperture, wherein the second handle piece defines a second aperture, wherein the locking element is aligned with and guided by the first aperture, and wherein the button is aligned with and guided by the second aperture.

5. The tool of claim 4, wherein the button and the locking element are not mechanically coupled to the handle portion or the spring.

6. The tool of claim 2, wherein the folding tool portion comprises a stopping surface defined by the cam portion, wherein in the deployed position, the folding tool portion is secured rotationally about the folding tool axis in a first direction by the locking element engaging the locking surface and in a second direction by the stopping surface engaging the abutment.

7. The tool of claim 6, wherein the handle portion comprises a first handle piece and a second handle piece, wherein the abutment is integrally formed with the first handle piece.

8. The tool of claim 1, wherein the locking element defines a detent ball, wherein the cam portion defines a recess, wherein in the folded, stowed position the detent ball engages the recess and holds the folding tool portion in the folded, stowed position.

9. The tool of claim 1, wherein the locking element defines the arcuate surface, wherein the arcuate surface of the locking element engages the locking surface of the folding tool portion at different angles based on a degree of overlap between the locking surface and the arcuate surface.

10. A tool comprising:

a handle portion comprising a first handle piece and a second handle piece, the first handle piece defining an abutment;

a folding tool portion, wherein the folding tool portion is configured to be rotatable about a folding tool axis in a first direction from a folded, stowed position at least partially between the first handle piece and the second handle piece to a deployed position substantially outside of the handle portion, wherein the folding tool portion comprises a cam portion disposed about the folding tool axis, wherein the cam portion defines a locking surface;

a locking element, wherein the locking element is configured to be captured between the locking surface of the folding tool portion and the abutment in response to the folding tool portion moving to the deployed position, wherein in the deployed position further rotation in the first direction about the folding tool axis is precluded by the folding tool portion engaging the abutment, wherein the locking element is spring biased by a spring in a direction parallel to the folding tool axis, wherein the locking element defines at least one of an arcuate surface or a wedge surface for engaging the locking surface of the folding tool portion; and a button defining a central button axis extending therethrough parallel to the folding tool axis, wherein the locking element defines a central locking element axis parallel to the folding tool axis, wherein the central button axis and the central locking element axis are offset from one another, wherein the button is at least one of attached to the locking element or integrally formed with the locking element, and wherein the button is configured to drive the locking element against spring bias to disengage the locking element from the locking surface.

11. The tool of claim 10, wherein the handle portion defines a first handle piece and a second handle piece, wherein the first handle piece defines a first aperture, wherein the second handle piece defines a second aperture, wherein the locking element is aligned with and guided by the first aperture, and wherein the button is aligned with and guided by the second aperture.

12. The tool of claim 11, wherein the button and the locking element are not mechanically coupled to the handle portion or the spring.

13. The tool of claim 10, wherein the locking element defines a detent ball, wherein the cam portion defines a recess, wherein in the folded, stowed position the detent ball engages the recess and holds the folding tool portion in the folded, stowed position.

14. A tool comprising:

a handle portion comprising a first handle piece defining a first aperture and a second handle piece defining a second aperture;

a folding tool portion, wherein the folding tool portion is configured to be rotatable about a folding tool axis between a folded, stowed position at least partially between the first handle piece and the second handle piece, and a deployed position substantially outside of the handle portion, wherein the folding tool portion comprises a cam portion disposed about the folding tool axis, wherein the cam portion defines a locking surface;

a locking element, wherein the locking element is received within the first aperture wherein the locking element is movable along a locking axis parallel to the folding tool axis between an engaged position in which the locking element is engaged with the locking surface of the folding tool portion in the deployed position, and a disengaged position where the locking element does not contact the locking surface; and a button, wherein the button is received within the second aperture and is accessible through the second handle piece, wherein the button is at least one of attached to or integrally formed with the locking element, and wherein the button is movable along an axis parallel to the locking axis against a spring bias to move the locking element to the disengaged position, wherein the button defines a central button axis extending therethrough parallel to the folding tool axis, wherein the locking element defines a central locking element axis parallel to the folding tool axis, and wherein the central button axis and the central locking element axis are offset from one another.

15. The tool of claim 14, wherein the locking element defines a detent ball, wherein the cam portion defines a recess, wherein in the folded, stowed position the detent ball engages the recess and holds the folding tool portion in the folded, stowed position.

16. The tool of claim 14, wherein a surface of the locking element that engages the locking surface comprises a surface texture configured to engage the locking surface with a higher friction than a smooth surface texture.

* * * * *